US009399216B2

(12) United States Patent
Samper et al.

(10) Patent No.: US 9,399,216 B2
(45) Date of Patent: Jul. 26, 2016

(54) FLUID TRANSPORT IN MICROFLUIDIC APPLICATIONS WITH SENSORS FOR DETECTING FLUID PRESENCE AND PRESSURE

(71) Applicant: General Electric Company, Schenectady, NY (US)

(72) Inventors: Victor Donald Samper, Kirchseeon (DE); Christian Friedrich Peter Rensch, Munich (DE); Christoph Boeld, Munich (DE); Ruben Julian Salvamoser, Munich (DE)

(73) Assignee: General Electric Company, Niskayuna, NY (US)

( * ) Notice: Subject to any disclaimer, the term of this patent is extended or adjusted under 35 U.S.C. 154(b) by 394 days.

(21) Appl. No.: 14/144,066

(22) Filed: Dec. 30, 2013

(65) Prior Publication Data
US 2015/0182964 A1 Jul. 2, 2015

(51) Int. Cl.
*G01N 1/10* (2006.01)
*B01L 3/00* (2006.01)
(Continued)

(52) U.S. Cl.
CPC ......... *B01L 3/502746* (2013.01); *B01J 19/004* (2013.01); *B01J 19/0093* (2013.01); *G01F 22/02* (2013.01); *B01J 2219/0084* (2013.01); *B01J 2219/0097* (2013.01); *B01J 2219/00783* (2013.01); *B01J 2219/00891* (2013.01); *B01J 2219/00903* (2013.01); *B01J 2219/00959* (2013.01); *B01J 2219/00963* (2013.01); *B01J 2219/00986* (2013.01); *B01L 3/0293* (2013.01); *B01L 2400/08* (2013.01); *Y10T 137/0318* (2015.04)

(58) Field of Classification Search
CPC ..... G01N 1/10; B01L 3/502746; G01F 22/02; B01J 19/0093; B01J 19/004
USPC ................. 422/67, 502, 504, 509; 436/180
See application file for complete search history.

(56) References Cited

U.S. PATENT DOCUMENTS 3,568,735 A  3/1971 Lancaster
4,120,205 A  10/1978 Ripphahn et al.
(Continued)

FOREIGN PATENT DOCUMENTS

DE  19949912  5/2001
DE  102006006706  8/2007

OTHER PUBLICATIONS

Garcia-Cordero et al., "Low-Cost Microfluidic Single-Use Valves and On-Board Reagent Storage using Laser-Printer Technology", IEEE 22nd International Conference on Micro Electro Mechanical Systems, pp. 439-442, Jan. 2009.
(Continued)

*Primary Examiner* — Arlen Soderquist
(74) *Attorney, Agent, or Firm* — Melissa K. Dobson

(57) ABSTRACT

A method includes flowing a liquid into a channel of a microfluidic cassette filled with a gas. The channel includes an inlet section and an outlet section. The method also includes detecting the liquid, the gas, or a combination thereof at a measuring location within the inlet section. The measuring location has a first sensor that may detect a signal indicative of a presence of the liquid, the gas, or a combination thereof. The method also includes compressing the gas, determining a pressure change of the gas within the channel, and determining a volume of the liquid within the channel based on the pressure change of the gas.

20 Claims, 7 Drawing Sheets

(51) Int. Cl.
  *B01J 19/00* (2006.01)
  *G01F 22/02* (2006.01)
  *B01L 3/02* (2006.01)

(56) References Cited

U.S. PATENT DOCUMENTS

| | | | |
|---|---|---|---|
| 4,388,411 A | 6/1983 | Lovelock | |
| 4,875,605 A | 10/1989 | Weston | |
| 4,925,444 A | 5/1990 | Orkin et al. | |
| 5,039,863 A | 8/1991 | Matsuno et al. | |
| 5,632,876 A | 5/1997 | Zanzucchi et al. | |
| 5,756,050 A | 5/1998 | Ershow et al. | |
| 5,776,103 A | 7/1998 | Kriesel et al. | |
| 5,786,679 A | 7/1998 | Nishino et al. | |
| 5,872,010 A | 2/1999 | Karger et al. | |
| 5,957,167 A | 9/1999 | Feygin | |
| 5,961,492 A | 10/1999 | Kriesel et al. | |
| 5,988,435 A | 11/1999 | Edwards et al. | |
| 6,024,925 A | 2/2000 | Little et al. | |
| 6,068,751 A | 5/2000 | Neukermans | |
| 6,120,733 A | 9/2000 | Goodman et al. | |
| 6,140,866 A | 10/2000 | Wang | |
| 6,173,073 B1 | 1/2001 | Wang | |
| 6,193,471 B1* | 2/2001 | Paul | B01F 11/0071 417/118 |
| 6,318,970 B1 | 11/2001 | Backhouse | |
| 6,360,775 B1* | 3/2002 | Barth | G02B 6/3538 137/803 |
| 6,395,232 B1 | 5/2002 | McBride | |
| 6,406,605 B1 | 6/2002 | Moles | |
| 6,454,759 B2* | 9/2002 | Krulevitch | A61K 9/0097 424/423 |
| 6,457,361 B1 | 10/2002 | Takeuchi et al. | |
| 6,499,515 B2 | 12/2002 | Sander | |
| 6,506,611 B2 | 1/2003 | Bienert et al. | |
| 6,524,456 B1 | 2/2003 | Ramsey et al. | |
| 6,524,790 B1 | 2/2003 | Kopf-Sill et al. | |
| 6,534,009 B1* | 3/2003 | Yao | B01J 19/0093 422/68.1 |
| 6,607,907 B2* | 8/2003 | McNeely | B01J 19/0093 422/130 |
| 6,623,455 B2 | 9/2003 | Small et al. | |
| 6,631,648 B2 | 10/2003 | Lal et al. | |
| 6,706,538 B1 | 3/2004 | Karg et al. | |
| 6,743,636 B2* | 6/2004 | Chung | B01F 15/0248 422/504 |
| 6,774,616 B2 | 8/2004 | Huhn et al. | |
| 6,794,981 B2 | 9/2004 | Padmanabhan et al. | |
| 6,805,841 B2 | 10/2004 | Shvets et al. | |
| 7,040,144 B2 | 5/2006 | Spaid et al. | |
| 7,067,086 B2 | 6/2006 | Huhn et al. | |
| 7,122,153 B2 | 10/2006 | Ho | |
| 7,213,473 B2 | 5/2007 | Mosier et al. | |
| 7,258,253 B2 | 8/2007 | Nicol et al. | |
| 7,377,183 B2 | 5/2008 | Su et al. | |
| 7,435,381 B2 | 10/2008 | Pugia et al. | |
| 7,459,127 B2 | 12/2008 | Pugia et al. | |
| 7,459,128 B2 | 12/2008 | Karg et al. | |
| 7,628,082 B2 | 12/2009 | Sparks et al. | |
| 7,741,121 B2 | 6/2010 | Elizarov et al. | |
| 7,790,118 B2 | 9/2010 | Maltezos et al. | |
| 7,829,032 B2* | 11/2010 | Van Dam | B01J 19/0093 422/159 |
| 7,972,561 B2 | 7/2011 | Viovy et al. | |
| 7,976,789 B2* | 7/2011 | Kenis | B01F 3/0807 422/245.1 |
| 7,985,198 B2 | 7/2011 | von Blumenthal et al. | |
| 8,210,209 B2 | 7/2012 | Gilbert et al. | |
| 8,268,262 B2 | 9/2012 | Andersson et al. | |
| 9,067,189 B2* | 6/2015 | Samper | B01J 19/0093 |
| 9,138,714 B2* | 9/2015 | Samper | B01J 19/0093 |
| 9,192,934 B2* | 11/2015 | Rensch | B01L 3/502707 |
| 2002/0011276 A1* | 1/2002 | Sander | F04B 43/043 141/59 |
| 2002/0176802 A1* | 11/2002 | Chung | B01F 15/0248 422/504 |
| 2004/0258569 A1* | 12/2004 | Yamazaki | B01F 13/0059 422/514 |
| 2005/0265908 A1 | 12/2005 | Boe et al. | |
| 2006/0222569 A1 | 10/2006 | Barten et al. | |
| 2006/0235335 A1 | 10/2006 | Elsenhans et al. | |
| 2008/0064110 A1* | 3/2008 | Elizarov | C07B 59/00 436/50 |
| 2008/0131327 A1* | 6/2008 | Van Dam | B01L 3/502715 422/400 |
| 2008/0233018 A1* | 9/2008 | van Dam | B01J 19/0093 422/159 |
| 2009/0008395 A1 | 1/2009 | Sattler et al. | |
| 2009/0129988 A1 | 5/2009 | Talmer et al. | |
| 2010/0158756 A1 | 6/2010 | Taylor et al. | |
| 2010/0304986 A1 | 12/2010 | Chen et al. | |
| 2011/0070160 A1* | 3/2011 | Nutt | A61K 51/0491 424/1.89 |
| 2012/0025521 A1* | 2/2012 | Baller | B01J 19/0093 285/328 |
| 2012/0183956 A1 | 7/2012 | Ross et al. | |
| 2012/0267561 A1 | 10/2012 | Samper et al. | |
| 2012/0276641 A1 | 11/2012 | Dimov et al. | |
| 2013/0053994 A1* | 2/2013 | Rensch | G06F 19/3406 700/95 |
| 2013/0108513 A1* | 5/2013 | Samper | B01J 19/0093 422/129 |
| 2013/0170931 A1* | 7/2013 | Samper | B01J 19/0093 414/293 |
| 2013/0183209 A1 | 7/2013 | Richter et al. | |
| 2013/0255789 A1* | 10/2013 | Samper | B01J 19/0093 137/3 |
| 2013/0316335 A1 | 11/2013 | Ross et al. | |
| 2014/0120010 A1* | 5/2014 | Rensch | B01L 3/502707 422/503 |
| 2014/0170758 A1* | 6/2014 | Baller | B01J 19/004 436/58 |
| 2015/0182963 A1* | 7/2015 | Samper | B01J 19/0093 422/502 |

OTHER PUBLICATIONS

Zheng et al., "A Screw-Actuated Pneumatic Valve for Portable, Disposable Microfluidics", Lab on a Chip, pp. 469-472, vol. 9, Issue 4, 2009.
Chen et al., "An Integrated, Self-Contained Microfluidic Cassette for Isolation, Amplification, and Detection of Nucleic Acids", Biomed Microdevices, pp. 705-719, vol. 12, Issue 4, Aug. 2010.
Siegrist et al., "Microfluidics for IVD analysis: Triumphs and hurdles of centrifugal platforms Part 3: Challenges and solutions", Microfluidics for IVDs, pp. 22-26, 2010.
Tseng, W.Y., et al.; "PDMS Evaporation Chip to Concentrate [18F]Fluoride for Synthesis of Pet Tracers in Microfluidics", 14th International Conference on Miniaturized Systmes for Chemistry and Life Sciences, Oct. 2010, Groningen, The Netherlands.
Abi-Samra et al., "Infrared Controlled Waxes for Liquid Handling and Storage on a CD-Microfluidic Platform", Lab on a Chip, pp. 723-726, vol. 11, Issue 4, Feb. 21, 2011.
Rensch, Christian, et al.; "Microfluidics: A Groundbreaking Technology for PET Tracer Production", Molecules Jul. 2013, 18, 7930-7956.
U.S. Appl. No. 13/731,347, filed Dec. 31, 2102, Rensch et al.
U.S. Appl. No. 14/144,047, filed Dec. 30, 2013, Samper et al.

* cited by examiner

FLUID TRANSPORT IN MICROFLUIDIC APPLICATIONS WITH SENSORS FOR DETECTING FLUID PRESENCE AND PRESSURE

BACKGROUND

The subject matter disclosed herein relates generally to microfluidic systems, and more particularly, to systems and methods for metering a reagent.

Various medical procedures utilize reagents or mixtures of reagents for treatment or diagnosis of patient conditions. For example, certain imaging modalities use radiopharmaceuticals to generate medical images of a patient. Examples of such imaging modalities include positron emission tomography (PET) and single photon emission computed tomography (SPECT). PET and SPECT are used in conjunction with a radiopharmaceutical or a radioactive tracer that is administered to (e.g., injected into) the patient, which results in the emission of gamma rays from locations within the patient's body. The emitted gamma rays are then detected by the PET or SPECT detector and an image is created based on characteristics of the detected gamma ray emissions. Additionally, certain radiopharmaceuticals may be used to treat various patient conditions. Examples of radiopharmaceuticals include FDG (2-[$^{18}$F]-fluoro-2-deoxyglucose), other $^{18}$F based fluorinated tracers, $^{13}$N ammonia, $^{11}$C based tracers, $^{15}$O gas, and $^{15}$O water, and others.

Radiopharmaceuticals have short half lives ranging from about two minutes to about 2 hours, and thus, the injection and imaging generally takes place within a short time after production of the radiopharmaceutical. Accordingly, to prevent undue decay of such radiopharmaceuticals prior to use, the radiopharmaceuticals are often synthesized onsite at medical facilities where the PET or SPECT system is located. However, the systems used to generate such radiopharmaceuticals often use dedicated pumps for each reagent used in the synthesis process. The dedicated pumps may have limited volumes, and therefore limit scaling up or scaling down the amount of reagents used in the system. Moreover, the pumps may need to be cleaned after each use to minimize contamination of subsequent batches of radiopharmaceuticals. Decontamination of the pumps may be inefficient, generate additional waste, and reduce technician workflow. Accordingly, there is a need to develop a system to overcome the limitations associated with the use of dedicated pumps to generate radiopharmaceuticals.

BRIEF DESCRIPTION

In one embodiment, a method includes flowing a liquid into a channel of a microfluidic cassette filled with a gas. The channel includes an inlet section and an outlet section. The method also includes detecting the liquid, the gas, and a combination thereof at a measuring location within the inlet section. The measuring location has a first sensor that may detect a signal indicative of a presence of the liquid, the gas, and a combination thereof. The method also includes compressing the gas, determining a pressure change of the gas within the channel, and determining a volume of the liquid within the channel based on the pressure change of the gas.

In another embodiment, a system includes a microfluidic chip including a first chamber that may store a reagent and is fluidly coupled to a second chamber via a first channel. The microfluidic chip also includes a metering chamber disposed along the first channel. The metering chamber includes a second channel having an inlet section and an outlet section and the metering chamber may meter a volume of the reagent to the second chamber based on a pressure change of a gas within the second channel. The system also includes a control system communicatively coupled to the microfluidic chip. The control system may provide instructions to one or more valves associated with the microfluidic chip. The one or more valves may control influx and efflux of the reagent, the gas, or a combination thereof within the metering chamber.

In a further embodiment, a microfluidic chip includes a first chamber that may store a reagent and fluidly coupled to a second chamber via a first channel. The microfluidic chip also includes a metering chamber disposed along the first channel. The metering chamber includes a second channel having an inlet section and an outlet section. The outlet section may be coupled to a gas source. The microfluidic chip also includes a first sensor disposed at a measuring site within the inlet section. The first sensor may detect a fluid within the measuring site. The microfluidic chip further includes a second sensor disposed at the outlet section. The second sensor may detect a pressure of the fluid.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
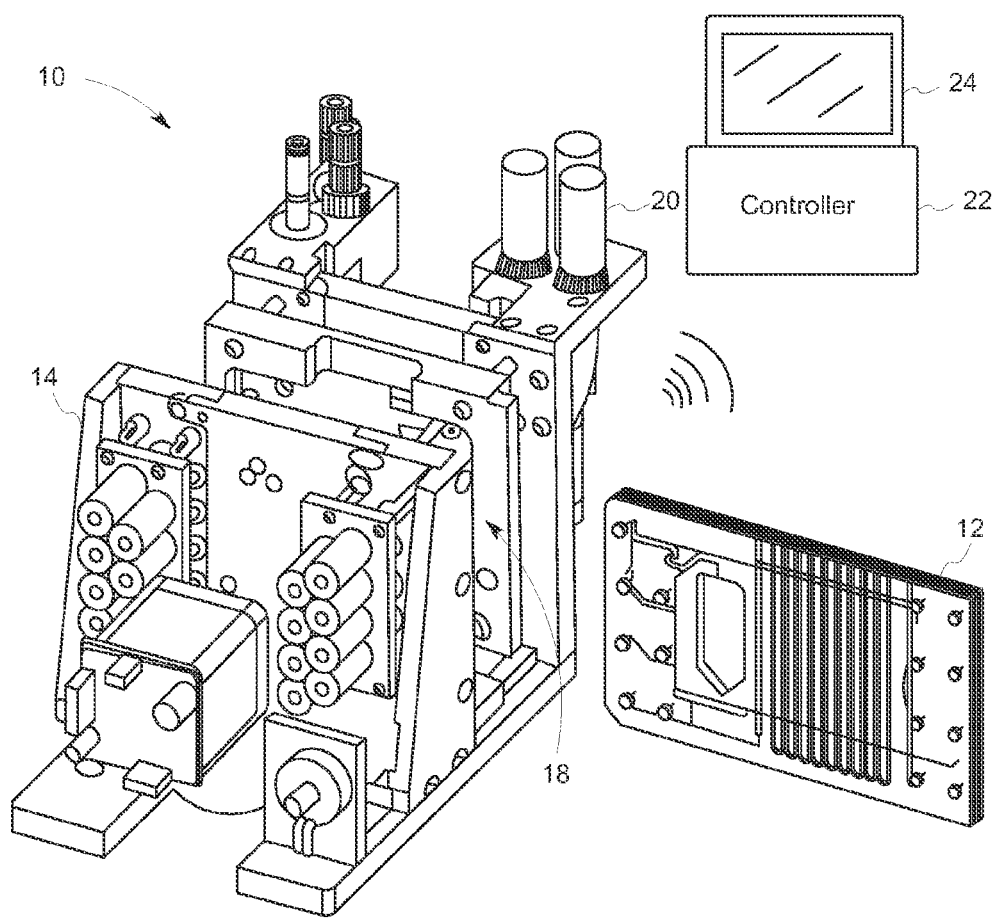
FIG. 1 is a schematic of a radiopharmaceutical synthesizer receiving a microfluidic cassette, in accordance with an embodiment.

The present disclosure relates to microfluidic devices that incorporate contactless dosing and processing of radiopharmaceuticals. The microfluidic devices are configured to pneumatically transfer defined volumes of a slug of a desired liquid to various components (e.g., a reservoir, a reactor, etc.) within the microfluidic devices. For example, a pressurized gas may be used to move the slug throughout the microfluidic device. The pressurized gas may be used to apply a pressure differential across the slug, and therefore, cause the slug to move through a channel within the microfluidic device. This may facilitate transfer of the slug from one compartment to another within the microfluidic device. For example, the slug may act as a piston, and thus, compress a gas within a space between the slug and a dead-end of the channel, forming a pressurized gas within the channel. As such, the piston-like compression of a trapped volume of the gas may cause a pressure change to be created in an enclosed volume by the movement of the slug. As described in detail below, this pressure change and possible pressure differential may facilitate measuring and transferring a volume of the slug without using mechanical actuators, and consequently, dosing of the radiopharmaceutical. Accordingly, the present disclosure provides a disposable microfluidic system that includes pneumatic flow control and sensing methods to transfer known volumes of the slug and generate radiopharmaceuticals.

Radiopharmaceutical production is relatively complex and involves specialized equipment and skilled personnel. Many parts of a system for synthesizing such compounds are shielded in heavily reinforced structures. The use of microfluidic systems for radiopharmaceutical production facilitates smaller-scale production of compounds at the point of use, which in turn may allow production of such compounds in smaller facilities and with smaller synthesis machines. However, many microfluidic systems use mechanical actuators (e.g., syringe pumps) to control a volume and flow rate of reagents during radiopharmaceutical synthesis. Following generation of the radiopharmaceutical, reagents and radioactive materials used to generate the radiopharmaceutical may remain in the mechanical actuators. Accordingly, the mechanical actuators are generally decontaminated to avoid cross-contamination of subsequent processes (e.g., synthesis of additional batches of radiopharmaceuticals). Decontamination of the mechanical actuators may be tedious and time consuming for a technician. Moreover, the decontamination may be inefficient and generate additional undesired radioactive waste. Provided herein is a contactless microfluidic cassette (i.e., chip) that controls the volume and flow of radiopharmaceutical reagents within the microfluidic cassette without the use of mechanical actuators (e.g., pumps). In addition, the contactless microfluidic cassette may include additional features that may mitigate temperature fluctuations and flow rate variations that may be caused by compression of the gas within the channels of the microfluidic cassette.

Turning now to FIG. 1, a radiocompound synthesis system 10 is illustrated. The system 10 may be used for generating a radiopharmaceutical (e.g., a radioactive compound) that may be suitable for use in various medical treatments or imaging techniques, such as PET or SPECT imaging techniques. The system 10 includes a microfluidic cassette 12 (e.g., a microfluidic chip, a microfluidic storage device, etc.) and a synthesizer 14. The microfluidic cassette 12 may store one or more reagents, which may include nonradioactive reagents (e.g., reagents in a nonradioactive state). The microfluidic cassette 12 may also store dry solvents, aqueous substances (acidic, neutral, and alkali), and lyophilized substances. As shown, the synthesizer 14 may include a slot 18 (e.g., receptacle or cavity) that is shaped to receive and to accommodate the microfluidic cassette 12. Thus, during a synthesis process, the microfluidic cassette 12 may be placed within (e.g., inserted or loaded into) the slot 18. It should be understood that the synthesizer 14 may be configured to receive and to process more than one microfluidic cassette 12 (e.g., 2, 3, 4, 5, 6, 7, 8, 9, 10, or more) simultaneously or approximately simultaneously (e.g., during overlapping time periods). Through such techniques, one or more batches of the radiopharmaceutical, or different product as desired, may be generated.

The synthesizer 14 may also include additional components, such as, but not limited to, pumps, valves, reservoirs, and heaters to facilitate synthesis of the radiopharmaceutical. For example, in the illustrated embodiment, the synthesizer 14 includes a reservoir 20 to hold a desired radioisotope (e.g., $^{18}F$, $^{124}I$, $^{99m}Tc$, $^{11}C$, etc.), radioactive compound, solvents, diluents, flushing agents, or any other suitable reagent used to generate the radiopharmaceutical. However, in other embodiments, the synthesizer 14 may not include the reservoir 20. As such, all the reagents to generate the radiopharmaceutical may be stored or added to the microfluidic cassette 12 prior to inserting into the synthesizer 14.

The synthesizer 14 is generally configured to manipulate the microfluidic cassette 12 and/or to initiate a reaction process to generate a radiopharmaceutical using the reagents stored within the microfluidic cassette 12. The microfluidic cassette 12 and/or the synthesizer 14 may also be configured to provide reaction conditions (e.g., a temperature, a pressure, etc.) for synthesis of the radiopharmaceutical. Accordingly, the system 10 may include a control system 22 configured to control several features of the microfluidic cassette 12 and the synthesizer 14 to generate the radiopharmaceutical. In certain embodiments, the control system 22 may communicate with the microfluidic cassette 12, synthesizer 14, and a combination thereof wirelessly. In other embodiments, the control system 22 may communicate with a cabled connection.

The control system 22 may be a processor-based machine including a memory storing processor-executable instructions for facilitating all or part of a particular process step used for generating a radiopharmaceutical. The memory may be any suitable volatile memory device and/or a non-volatile mass-storage device, and in some embodiments, the control system 22 may be the synthesizer 14. The control system 22 may be configured to perform certain steps without user intervention or may be configured to receive a user input and execute instructions in response to the user input. The instructions may include providing an input to hardware components of the system 10, which may function to mechanically or otherwise physically interact with one or more components of the system 10. Moreover, the system 10 may include suitable user interface components, including a monitor 24 and/or user input controls. The monitor 24 may display information such as, but not limited to, reaction conditions (e.g., temperature, flow rate, volumes, pressures, etc.), process steps, warnings, or any other suitable information for the synthesis of the radiopharmaceutical to a user of the system 10. Additionally, certain process steps for the generation of the radiopharmaceutical may be performed by separate devices and/or separate means. For example, a first process step may be performed by the synthesizer 14, while a second process step may be performed by a user or by a separate processing device.

Figure 2:
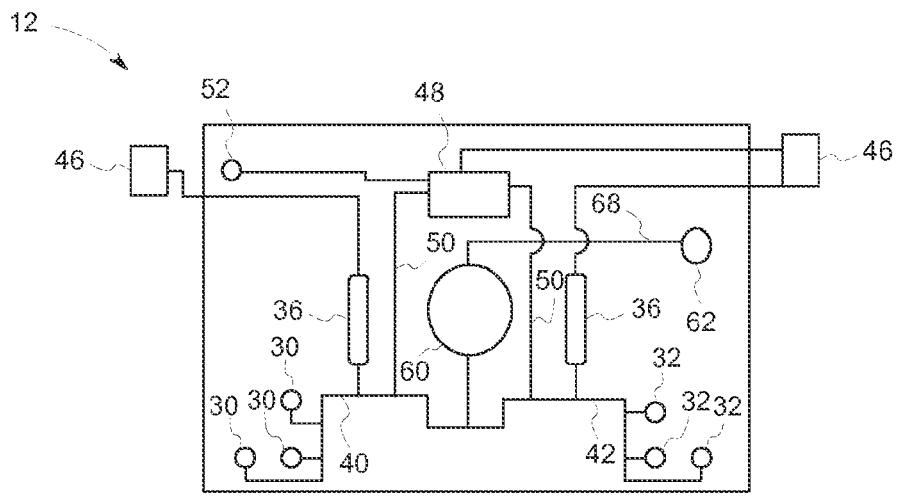
FIG. 2 is a schematic of the microfluidic cassette of FIG. 1, in accordance with an embodiment.

The microfluidic cassette 12 used in conjunction with the system 10 may have any suitable configuration and features that facilitates the synthesis of the radiopharmaceutical. FIG. 2 illustrates an embodiment of a configuration of the microfluidic cassette 12 that may be used with the system 10. To facilitate explanation and to simplify the illustration, individual valves are not shown in FIG. 2, though such valves are present in an implementation, such as between some or all of the various reservoirs and the fluidic channels connecting these reservoirs and/or reaction chambers. The microfluidic cassette 12 may be a continuous-flow cassette or a batch mode cassette. Moreover, the microfluidic cassette 12 may include capillary-based, hybrid, or integrated lab-on-chip systems. In certain embodiments, the microfluidic cassette 12 may be used to generate multiple batches of the radiopharmaceutical (e.g., may be reusable). In other embodiments, the microfluidic cassette 12 may be a disposable one-time use cassette. The microfluidic cassette 12 may be manufactured from any suitable material that is compatible with the reagents and radiopharmaceutical generated. For example, the microfluidic cassette 12 may be manufactured from polymers such as, but not limited to, polysiloxanes, polyethers, polyvinyls, polyethylenes, cyclic olefin copolymers, their derivatives, or combinations thereof.

In the illustrated embodiment, the cassette 12 includes reagent reservoirs 30 and 32 that store the reagents used to generate the radiopharmaceutical. In certain embodiments, the reagent reservoirs 30 and 32 may be dedicated to store either dry reagents or wet reagents. For example, the reagent reservoir 30 may be dedicated to store dry reagents, while the reagent reservoir 32 may be dedicated to store wet reagents. However, in other embodiments, the reagent reservoirs 30 and 32 may both store a combination of dry and wet reagents. When multiple reagent reservoirs are connected on a common line, they are individually addressed by addressing valves, though to simplify illustration such addressing valves are not shown in FIG. 2. The reagent reservoirs 30 and 32 may include a membrane to contain the reagents within the reservoirs. The membrane may be an isolation valve or blister (e.g., fluid filled pocket) that is compromised (e.g., ruptured, broken) by heat, force, or any other suitable mechanism. Rupture of the membrane may release the reagents from the reagent reservoirs 30 and 32 for further processing. In certain embodiments, the membrane may be manufactured from metal, polymeric materials, or any other suitable material, or a combination thereof that is compatible with the reagents. In other embodiments, the reagent reservoirs 30 and 32 may include glass ampules filled with the reagents. The glass ampules may be crushed (i.e., broken) to release the reagents.

Once the reagents are release from their corresponding reservoirs (e.g., reservoirs 30 and 32), the reagents may flow into a metering chamber 36 via a channel 40 and 42, and the appropriate addressing valves. The metering chamber 36 is coupled to a gas source 44 (not shown in FIG. 2 but connected to element 46) that may be used to facilitate dosing (e.g., metering) and flow rate control of the reagents, as described in detail below with respect to FIG. 3. In certain embodiments, a gas flowing from the gas source 44 may be filtered by one or more filters 46 prior to entering the cassette 12 to maintain sterility within the cassette 12. The one or more filters 46 may be integrated into the cassette 12 during manufacturing. However, the one or more filters 46 may be attached to the cassette 12 at any point prior to use of the cassette 12. In one embodiment, the one or more filters 46 may be disposed within an interior of the cassette 12 any location between the gas source 44 and the metering chamber 36 such that the gas entering the metering chamber 36 is free of any contaminants that may affect sterility of the cassette 12. In other embodiments, the one or more filters 46 may be disposed on an exterior of the cassette 12 between the gas source 44 and the cassette 12. The one or more filters 46 may include filter frits, membranes, or any other suitable filtering component, or combinations thereof having a pore size of approximately 0.5 microns to 0.1 microns.

The metering chamber 36 is fluidly coupled to an azeotropic dryer 48 via a channel 50 and the appropriate addressing valves (not shown in FIG. 2). The azeotropic dryer 48 may remove any undesirable moisture from the reagents. While in the azeotropic dryer 48, the reagents may be mixed using any suitable method. For example, the reagents may be mixed via a vacuum assisted turbulent-like mixing, chemically assisted mixing (e.g., by production of carbon dioxide generated from an acid/base reaction), pressure assisted mixing, or any other suitable mixing technique. In other embodiments, the reagents may be mixed before or after entering the azeotropic dryer 48. Any waste generated during the drying process may be collected in a waste reservoir 52, via the appropriate addressing valve (not shown in FIG. 2). Additional waste reservoirs may be distributed within the microfluidic cassette 12 to collect any waste generated from the radiopharmaceutical synthesis process.

Following drying of the reagents, the gas source 44 (not shown in FIG. 2) may apply pressure to the azeotropic dryer 48 and flow the reagents into a reactor 60, via the appropriate addressing valves (not shown in FIG. 2). In other embodiments, pump actuators (e.g., micropumps) may be used to flow the reagents out of the azeotropic dryer 48. The reactor 60 may be used to synthesize the radiopharmaceutical from the reagents stored in the reagent reservoirs 30 and 32. In the depicted embodiment, the reactor 60 is shown as a coin-shaped reactor. However, the reactor 60 may have any suitable shape or structure. For example, the reactor 68 may be a micro-channel or capillary-based reactor, or integrated ring-shaped reactor. While in the reactor 60 the reagents are mixed and reacted under suitable conditions, to form the radiopharmaceutical. In other embodiments, the reagents are mixed before entering the reactor 60. The reagents may be mixed via a vacuum assisted turbulent-like mixing, chemically assisted mixing (e.g., by production of carbon dioxide generated from an acid/base reaction), pressure assisted mixing, or any other suitable mixing technique.

The radiopharmaceutical may be collected in a product reservoir 62, via an appropriate addressing valve if necessary (valve not shown in FIG. 2). The product reservoir 62 may be fluidly coupled to the reactor 60 via a channel 68. The radiopharmaceutical may be stored in the product reservoir 62 temporarily for further processing. For example, after generation of the radiopharmaceutical, the technician may remove the microfluidic cassette 12 from the synthesizer 14 and withdraw the radiopharmaceutical from the product reservoir 62 for processing (e.g., purification, analysis and/or patient administration).

Figure 3:
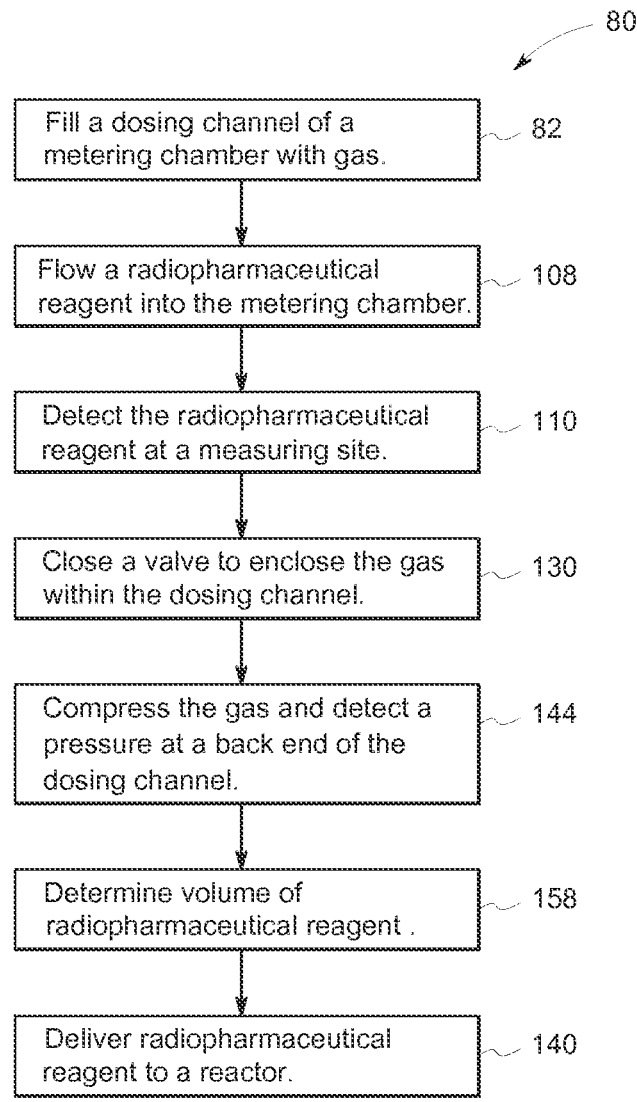
FIG. 3 is a flow diagram of a method of metering a reagent within the microfluidic cassette of FIG. 1, in accordance with an embodiment.

As noted above, the present disclosure provides, among other things, techniques that may be used to control the volume and flow of a slug containing one or more radiopharmaceutical reagents and/or product with a contactless microfluidic cassette (e.g., microfluidic cassette 12). Accordingly, the microfluidic cassette 12 may meter the reagents for radiopharmaceutical synthesis without the use of mechanical actuators. One such approach is depicted in FIG. 3, which illustrates an embodiment of a method 80 to meter the reagents within the microfluidic cassette 12 used in the system 10. In addition, to facilitate discussion of aspects of the method 80, reference is made to FIGS. 4-8 illustrating the acts of the method 80. It should be noted that the steps of the method 80 may be performed automatically, by a user, or both. Indeed, any one or a combination of the method steps described herein may be performed by such a system, which may include one or more tangible, non-transitory, machine-readable media storing processor-executable code (e.g., instructions), and one or more processing devices (e.g., control system 22) configured to execute the code, where the code, when executed, performs the automated steps described herein.

The method 80 includes providing a metering chamber (e.g., metering chamber 36) with a gas to fill a dosing channel within the metering chamber (block 82). As discussed above, the metering chamber 36 is coupled to the gas source 44. Accordingly, gas from the gas source 44 fills the dosing channel in the metering chamber 36.

Figure 4:
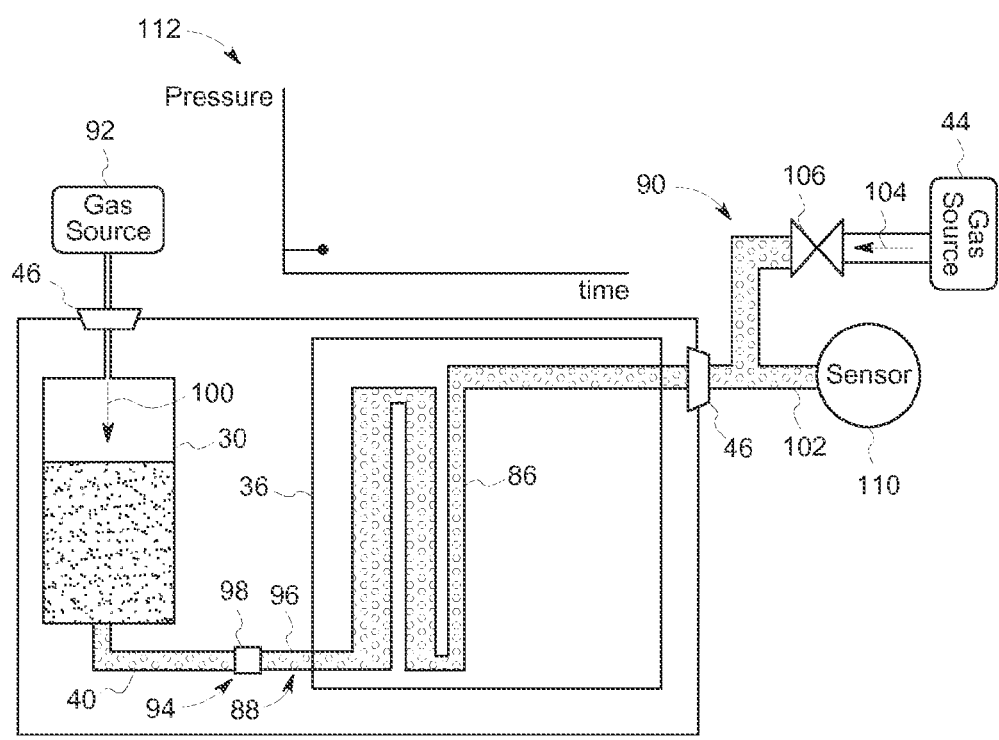
FIG. 4 is a schematic of a metering chamber within the microfluidic cassette of FIG. 2 having a channel filled with a gas and valve disposed on an exterior of the microfluidic cassette, in accordance with an embodiment.
Figure 5:
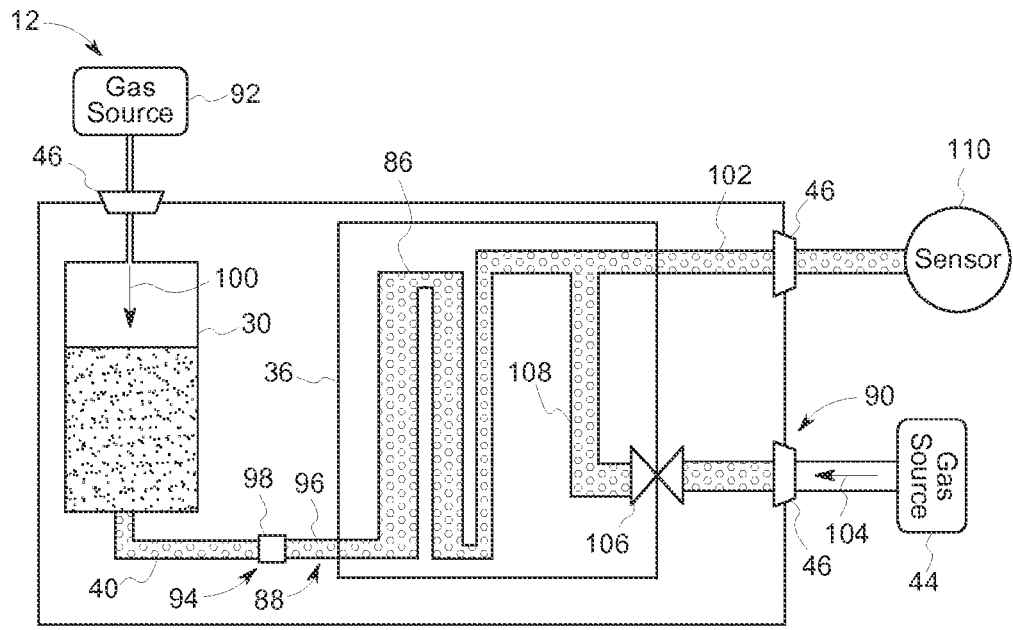
FIG. 5 is a schematic of a metering chamber within the microfluidic cassette of FIG. 2 having a channel filled with a gas and a valve disposed within the microfluidic cassette, in accordance with an embodiment.

One embodiment of the acts of block 82 is depicted in FIG. 4. To facilitate discussion of FIG. 4, reference will only be made to reservoir 30. In particular, FIG. 4 illustrates a portion of the cassette 12 including the metering chamber 36 having a dosing channel 86 with inlet and outlet sections 88 and 90, respectively. The inlet section 88 fluidly couples the dosing channel 86 with the reagent reservoir 30. In the illustrated embodiment, the inlet section 88 includes a measuring site 94 and a channel 96. The measuring site 94 may include a sensor 98 to detect fluids entering the dosing channel 86, as will be discussed below. In certain embodiments, the inlet section 88 may also include an actuator (e.g., micropump) to facilitate a flow of the reagents into the dosing channel 86. In other embodiments, the flow of the reagents may be facilitated by a gas flowing into the reservoir 30 from a gas source 92, as indicated by arrow 100. The outlet section 90 fluidly couples the dosing channel 86 with the gas source 44. Accordingly, a gas 102 flows into the dosing channel 86, as indicated by arrow 104, to fill the dosing channel 86 and provide a positive pressure at the inlet section 88. The gas 100 and 102 may be any suitable gas, such as nitrogen, air, argon, any other inert gas, and combination thereof. As discussed above, the gas 102 may be filtered through the one or more filters 46 prior to entering the metering chamber 36 to maintain sterility within the cassette 12. Similarly, the gas 100 may also be filtered prior to entering the reservoir 30. It should be appreciated that the metering chamber 36 may also include additional features (i.e., valves, micropumps, sensors, etc.) to facilitate dosing, influx, and efflux of fluids (e.g., reagents, solvents, gas, etc.) in the metering chamber 36. The cassette 12 includes a valve 106 disposed near the outlet section 90 that may be opened or closed to allow or block, respectively, a flow of the gas 102 within the dosing channel 86. While in the illustrated embodiment, the valve 106 is disposed external to the cassette 12, the valve 106 may also be disposed within the cassette 12. For example, FIG. 5 illustrates a portion of the cassette 12 having the valve 106 disposed within the boundaries of the cassette 12. In this particular embodiment, the valve 106 may be disposed along a channel 108 that branches off the dosing channel 86. However, the valve 106 may be disposed at any other suitable location within the cassette 12. Integrating the valve 106 into the cassette 12 may improve fluid dynamics within the metering chamber 36 by reducing the metering volume. In addition, variability in the metering volume may be controlled during fabrication of the cassette 12. The metering volume is chosen to match the response of the pressure sensor 110, in order to provide the maximum sensitivity and volume range around the region of gas compression associated with the target metered volume.

Additionally, the cassette 12 may include one or more pressure sensors 110 configured to measure a pressure of the gas 102 within the dosing channel 86 during operation of the system 10. For example, turning back to FIG. 4, the pressure sensor 110 may sense a constant pressure within the dosing channel 86 as the gas 102 fills the dosing channel 86, as indicated by graph 112. In certain embodiments, the monitor 24 may display the graph 112 to indicate the pressure of the gas 102 in the dosing channel 86 over time. In other embodiments, the monitor 24 may only display the pressure value at a given time.

Returning to the method 80, following addition of the gas 102 into the dosing channel 86, the reagent from reagent reservoirs 30 and/or 32 are delivered to the metering chamber(s) 36 and form a reagent slug in each metering chamber (block 108). As discussed above, the inlet section 88 is fluidly coupled to the reservoirs 30 and 32. As such, the reagent within the reservoirs (e.g. reagent reservoirs 30 and 32) may enter the dosing channel 86 upon release from the reservoirs. In one embodiment, a pressure differential between the reagent reservoirs 30 and 32 and the channels 40 and 42, respectively, may drive a flow of the reagent slug into the metering chamber 36. For example, the gas 100 may exert a positive pressure within the reservoir 30. This positive pressure may cause the reagent to flow out of the reservoir 30 and into the channel 40, forming a reagent slug. In other embodiments, the reagent slug may be driven into the metering chamber 36 by actuators (e.g., micropumps) coupled to the reservoirs 30 and 32.

Figure 6A:
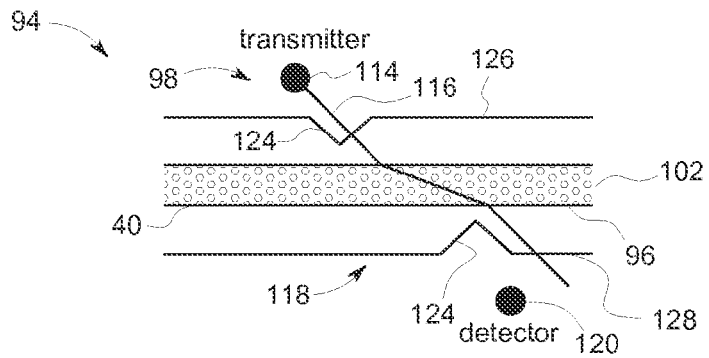
FIG. 6A is a schematic illustrating an unfilled measuring site of the metering chamber of FIG. 4, in accordance with an embodiment.
Figure 6B:
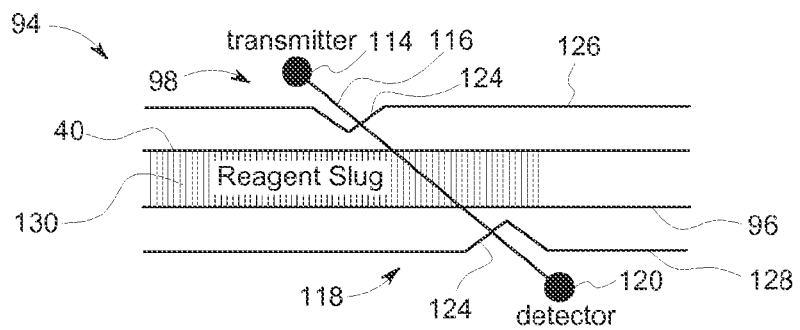
FIG. 6B is a schematic illustrating a gas filled measuring site of the metering chamber of FIG. 4, in accordance with an embodiment.

Prior to entering the dosing channel 86, the reagent slug flows through the measuring site 94 and may be detected by the sensor 98 (block 110). For example, the sensor 98 may continuously measure a refractive index, absorbance, or any other desired characteristic of fluids entering the measuring site 94 during any portion of the radiopharmaceutical generation process. Turning now to FIGS. 6A and 6B, a vertical cross-sectional view of the measuring site 94 is illustrated. As discussed above, the measuring site 94 may include the sensor 98 for detecting fluids within the measuring site 94. The sensor 98 may be utilized with any suitable optical or non-optical techniques that may be used for the detection of fluids within the measuring site 94. In certain embodiments, the sensor 98 may include a transmitter 114 (e.g., a light source) that transmits a signal 116 (e.g., a light signal) into a sensing region 118 of the measuring site 94. The transmitter 114 may transmit the signal 116 at any wavelength and frequency suitable for detecting the fluid (e.g., reagent slug, gas) within the measuring site 94. For example, the transmitter 114 may emit infra-red, visible, ultraviolet, or any other suitable wavelengths. The transmitter 114 may include one or more light emitting diodes, laser diodes, vertical cavity surface emitting laser (VCSEL), or tunable laser to transmit the desired signal 116. In certain embodiments, the transmitter 114 may be associated with an optical fiber. The transmitter 114 may transmit the signal 116 continuously or intermittently (e.g., discrete pulses).

The sensor 98 may also include a detector 120 configured to detect the signal 116 from the transmitter 114. In one embodiment, the sensor 98 may have an arrangement that facilitates detection of the signal 116 via transmittance. Accordingly, the detector 120 may be disposed opposite the transmitter 114, as illustrated in FIG. 6A. In other embodiments, the detector 120 may be disposed on the same side as the transmitter 114. As such, the signal 116 may be detected through reflectivity, rather than transmittance. In this particular embodiment, at least a portion of the measuring site 94 may include a light barrier to block the signal 116 from passing completely through the cassette 12. That is, the light barrier may reflect the signal 116 such that the detector 120 may receive the signal 116. The light barrier may be on an interior or exterior surface of the cassette 12 that is opposite a surface where the transmitter 114 and the detector 120 are disposed. The light barrier may include any suitable opaque coating or a thin film that reflects light entering the measuring site 94.

The measuring site 94 may also include features that may facilitate detection of the signal 116. In one embodiment, the measuring site may include grooves 124 on external surfaces 126 and 128 of the cassette 12. By incorporating the grooves 124 on the external surfaces 126 and 128, the flow of fluids (e.g., the reagent slug and gas) within the measuring site 94 may not be affected. Additionally, the grooves 124 may be easily implemented during manufacturing of the cassette 12 (e.g., via injection molding) without any additional costs or complications.

During operation of the system 10, the grooves 124 may cause marked signal changes within the sensing region 118 when the signal 116 passes through different fluids that may be flowing through the measuring site 94. For example, as illustrated in FIG. 6A, the signal 116 passes through the measuring site 94 filled with the gas 102. Because the refractive index of the gas 102 and the cassette 12 are different, the signal 116 may be refracted such that the signal 116 does not reach the detector 120. In contrast, when a reagent slug 130 is within the sensing region 118 the signal 116 may be detected, as illustrated in FIG. 6B. For example, in certain embodiments, the reagent slug 130 may have the same or a comparable refractive index as the cassette 12. Accordingly, as the signal 116 passes through the sensing region 118 the signal 116 may not be refracted. Therefore, the signal 116 may reach the detector 120. Detection of the signal 116 may indicate that the reagent slug 130 is flowing into the metering chamber 36 and the dosing channel 86 may be sealed at the outlet section 90, as will be discussed in further detail below with reference to FIG. 7. In other embodiments, the detector 120 may measure an intensity of the signal 116. For example, as the reagent slug 130 flows through the sensing region 118, the reagent slug 130 may absorb a portion of the signal 116. As such, the intensity of the signal 116 reaching the detector may decrease relative to the intensity of the signal 116 when the gas 102 is within the sensing region 118.

Figure 7:
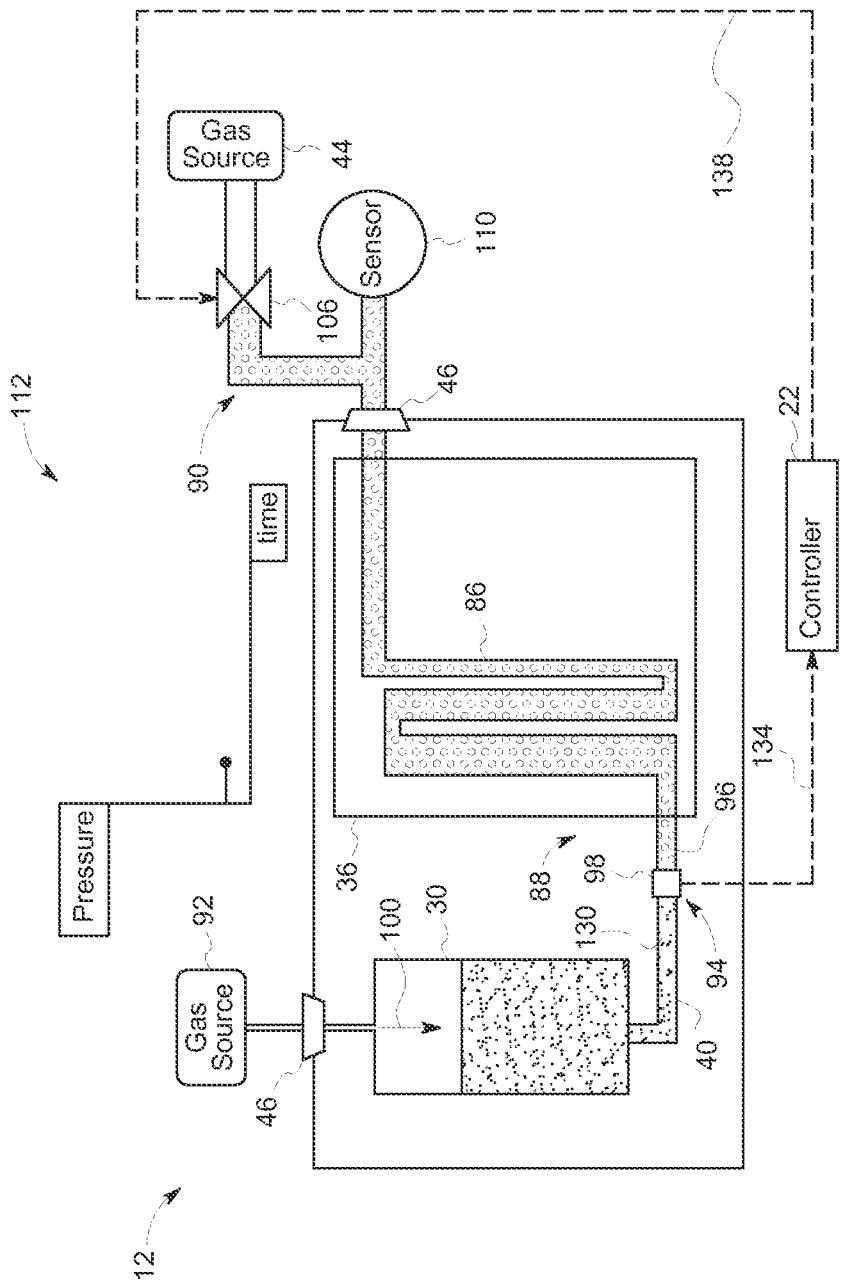
FIG. 7 is a schematic of the metering chamber of FIG. 4 having a reagent within the measuring site of FIG. 6B, in accordance with an embodiment.

Turning back to the method 80, immediately following detection of the reagent slug 130 the dosing channel 86 may be sealed by the valve 106 positioned at or near the outlet section 90 (block 130). Accordingly, as shown in FIG. 7, a known volume of the gas 102 is enclosed within the dosing channel 86. As discussed above, the sensor 98 detects the signal 116, corresponding to the presence, or lack thereof, of the reagent slug 130 within the measuring site 94 (block 110). In response to the detection of the signal 116, the sensor 98 may generate a corresponding signal 134 (e.g., wireless, electrical signal, etc). The controller 22 may receive and process the signal 134 and generate a signal 138 providing instructions to the valve 106. For example, in one embodiment, the controller 22 may signal the valve 106 to remain open, such as when the measuring site 94 is empty (i.e. unfilled) or filled with the gas 102, as illustrated in FIG. 4-6A. As such, the gas 102 may continue to flow into the dosing channel 86. In another embodiment, the controller 22 may signal the valve 106 to close following detection of the reagent slug 130 within the measuring site 94. Closing the valve 106 blocks the gas 102 from flowing out of the dosing channel 86 as the reagent slug 130 flows into the dosing channel 86. In addition to the signal 138 provided to the valve 106, the controller 22 may send signals to additional components (e.g., valves, pumps) within the microfluidic cassette 12 and system 10. For example, the controller 22 may also send signals to instruct the reagent reservoirs 30 and 32 to release the reagent into the metering chamber 36 after detection of the gas 102 within the measuring site 94.

Figure 8:
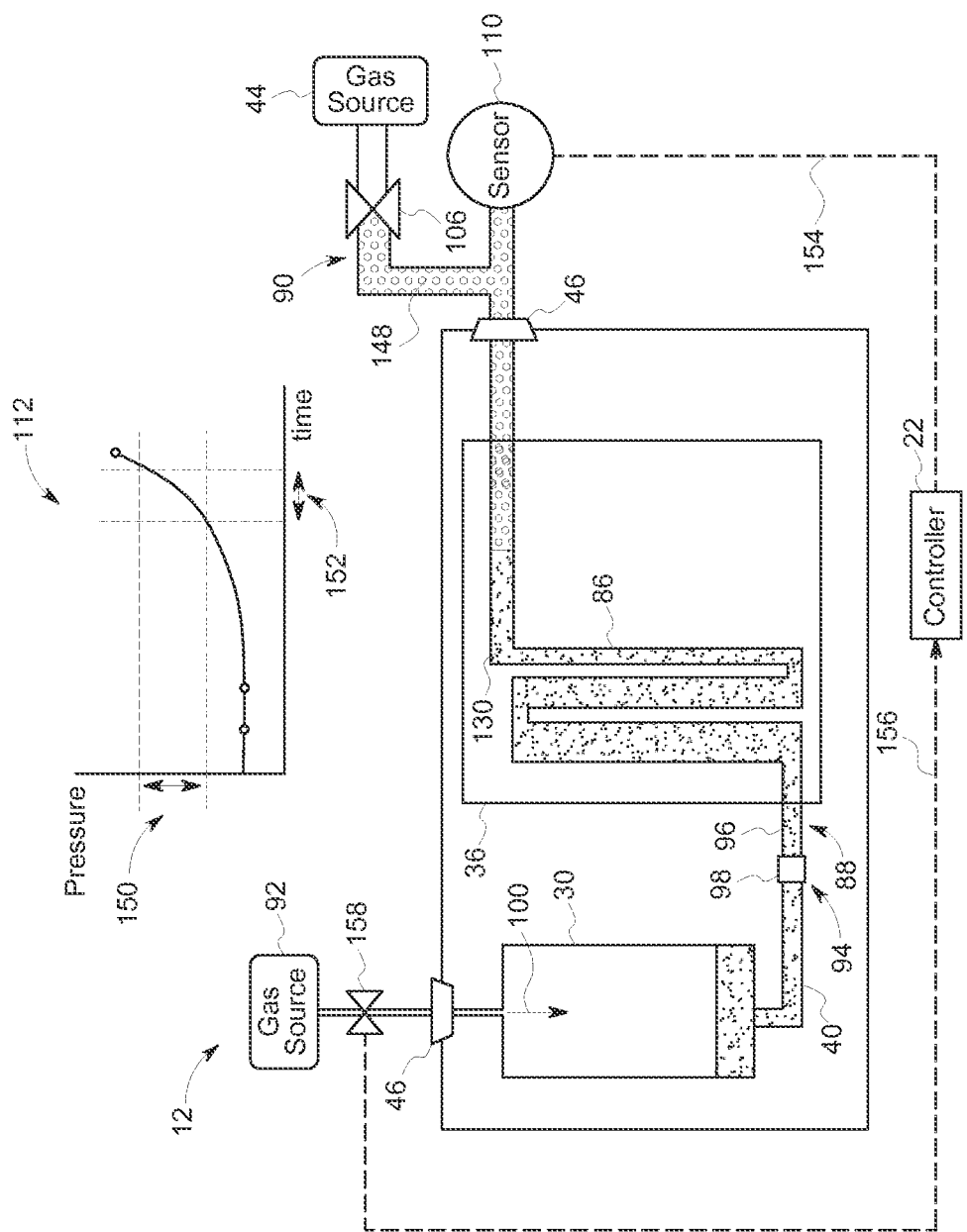
FIG. 8 is a schematic of the metering chamber of FIG. 4 having a channel partially filled with a reagent, in accordance with an embodiment.

Returning to the method 80, following closure of the valve 106, the gas 102 may be compressed by the influx of the reagent slug 130 into the dosing channel 86, creating a positive pressure at the outlet section 90 (block 144). The positive pressure may be detected and provide the controller 22 with information regarding the processing of the reagent slug 130 within the dosing channel 86. FIG. 8 is an embodiment of the metering chamber 36 having compressed gas 148 resulting from the performance of the acts of block 144. In the illustrated embodiment, the reagent slug 130 partially fills the dosing channel 86 and acts as a piston to move the gas 102 toward the outlet section 90. Accordingly, as the gas 102 is compressed, the gas 102 pushes against the closed valve 106 and the pressure sensor 110. The pressure differential across the reagent slug results in its motion. When the slug comes to rest, the pressure is balanced across its end faces. In this way, the gas in 102 is compressed by the reagent slug 130.

During compression of the gas 102, the pressure sensor 110 may continuously monitor a pressure of the gas 102 at the outlet section 90. The pressure sensor 110 may include a protective layer (e.g., a membrane, coating, or filter (e.g., filter 46)) to act as an interface between the gas (e.g., gasses 102 and 148) and the sensor 110. Such a protective layer may minimize contamination of the sensor 110 by the reagents and bi-products from the generation of the radiopharmaceutical. Moreover, in embodiments where the protective layer is a membrane, measurement accuracy may be increased by providing hydraulic pressure transmission to a surface of the sensor 110.

As the reagent slug 130 continues to flow into the dosing channel 96, the gas 102 is compressed down to a minimum volume (e.g., gas 148). As illustrated in FIG. 8, the gas 102 may reach a target pressure in the range 150 as the reagent slug 130 fills the dosing channel 86. The target pressure in the range 150 may indicate that a target volume in the range 152 of the reagent slug 130 within the dosing channel 86 has been achieved, as shown in graph 112. Upon reaching the target pressure in the range 150, the sensor 110 may send a signal to 154 to the controller 22 indicating that the gas 102 has been appropriately compressed. Accordingly, the controller 22 may send a corresponding signal 156 to one or more components (e.g., valves) within the cassette 12 to adjust or stop the flow of the gas 100 and allow the reagent slug 130 to flow out of the metering chamber 36, as will be discussed in further detail below.

As discussed above, the dosing channel 86 may meter (i.e., dose) the reagents within the microfluidic cassette 12 once the target pressure in the range 150 and the target volume in the range 152 have been reached. Accordingly, it may be desirable for the dosing channel 86 to have a known and well defined inner volume. Knowing the inner volume of the dosing channel 86 may facilitate metering of the reagents, as described in further detail below. The inner volume of the dosing channel 86 may be any suitable volume. For example, the inner volume of the dosing channel 86 may be between 100 μL to 1 mL depending on a desired final volume of the radiopharmaceutical generated by the microfluidic cassette 12. However, as should be appreciated, the inner volume of the dosing channel 86 may also be less than 100 μL or more than 1 mL, depending on the application. The inner volume of the dosing channel 86 may influence a geometry of the dosing channel 86. For example, in the illustrated embodiment, the dosing channel 86 has a meandering geometry so that it may accommodate a desired inner volume in a limited space of the microfluidic cassette 12. As such, the metering chamber 36 may occupy a small portion of the microfluidic cassette 12 and may not interfere with other components of the cassette 12 (e.g., reagent reservoirs, reactor, azeotropic dryer, etc.). However, the dosing channel 86 may have non-meandering geometries that are suitable for accommodating the desired inner volume. In certain embodiments, the dosing channel 86 may be coated to promote frictionless flow and minimize fluid retention within the dosing channel 86.

The dosing channel 86 may also have cross-sectional geometries that facilitate metering the reagent slug 130 at volumes within the target volume in the range 152. During compression of the gas 102 fluctuations in temperature and pressure may affect metering of the reagent slug 130 within the target volume in the range 152. For example, the temperature of the gas 102 may increase due to compression, and thus cause an increase in pressure of the gas 102. Accordingly, the target pressure in the range 150 of the gas 102 may be reached prior to reaching the target volume in the range 152 of the reagent slug 130 within the dosing channel 86. As such, the metered volume of the reagent slug 130 may be less than desired. To mitigate the pressure effects that may be caused by the increase in temperature of the gas 102, the dosing channel 86 may be designed to have a large surface to volume ratio. The large surface to volume ratio may facilitate heat loss within the dosing channel 86 at a rate higher than a rate flow rate of the reagent slug 130 into the dosing channel 86. Accordingly, pressure and flow rate variations within the dosing channel 12 may be minimized.

In certain embodiments, the dosing channel 86 may have cross sectional geometries such as, but not limited to, circular, rectangular, square, oval, triangular, polygonal, or any other suitable shape the is substantially flat and wide such that the dosing channel 86 has a large surface to volume ratio. As such, the dosing channel 86 may dissipate heat generated from the compression of the gas 102 at a rate that is faster than a flow rate of the reagent slug 130 into the dosing channel 86. Therefore, due to the rapid heat loss, the heat generated by the compression of the gas 102 may not substantially affect the pressure of the gas 102 and the desired target pressure in the range 150 and the target volume in the range 152 may be reached, resulting in correct dosing of the reagent slug 130. In other embodiments, the dosing channel 86 may include features, such as, but not limited to, pillars or surface dimples within an interior surface to increase the surface area, and consequently the surface to volume ratio of the dosing channel 86. Accordingly, dissipation of the heat generated from the compression of the gas 102 is facilitated and desired volumes of the reagent slug 130 may be metered.

In addition to having a large surface to volume ratio, a size of the dosing channel 86 may need to be optimized. An appropriately sized dosing channel 86 may facilitate measurement of the target pressure in the range 150 for the desired target volume in the range 152 of the reagent slug 130. For example, because the pressure change created by the reagent slug 130 is used to meter the volume of the reagent slug 130, an inappropriately sized dosing channel 86 may cause the pressure change for the desired target volume in the range 152 to be below or above the target pressure in the range 150. Therefore, the metered volume of the reagent slug 130 may be outside the target volume in the range 152. Accordingly, it may be necessary to optimize the size of the dosing channel 86 such that large changes in pressure may be measured for small changes in volume as the reagent slug 130 compresses the gas 102.

As discussed above, the pressure sensor 110 may monitor the pressure of the gas 102 within the dosing channel 86. Accordingly, when the target pressure in the range has been reached, the controller 22 may receive a signal 154 from the pressure sensor 110 indicating that the dosing channel 86 is filled with the reagent and the flow of the reagent slug 130 may be stopped. For example, the controller 22 may transmit the signal 156 instructing a valve 158 to close. As such, the flow of the gas 100 into the reservoir 30 may be stopped, and consequently, stop the flow of the reagent slug 130 into the dosing channel 86. In other embodiments, the controller 22 may provide instructions to an actuator (e.g., micropump) on the gas source 44 coupled to the reservoir 30 to adjust a pressure of the gas 100 such that a pressure at the inlet section 88 may be equilibrated to that of the outlet section 90. For example, the pressure differential across the reagent slug 130 may be approximately zero. Therefore, influx and efflux of the reagent slug 130 is stopped.

Turning back to the method 80, once the pressure at the outlet section 90 has been stabilized and the flow of the reagent slug 130 has stopped, the volume of the reagent slug 130 within the dosing channel 86 may be determined (block 158). This may be achieved by applying standard gas laws, such as Boyle's Law (e.g., $P_1V_1=P_2V_2$). For example, pressure values of the uncompressed gas 102 (e.g., before influx of the reagent slug 130) and the compressed gas 148 (e.g., after influx of the reagent slug 130) at the outlet section 90 may be used to calculate the volume of the compressed gas 148 within the dosing channel 86 (using $V_2=(P_1V_1)/P_2$). Due to the known inner volume of the dosing channel 86, a volume of the reagent slug 130 may be calculated based on the difference between the inner volume of the dosing channel 86 and the volume of the compressed gas 148. Because the dosing channel 86 is configured to mitigate the temperature fluctuations caused by the compression of the gas 102, the effects of the temperature fluctuations may be negligible. As such, the temperature of the gas 102 and the compressed gas 148 may be substantially the same and may be omitted during calculation of the volume of the compressed gas 148. Alternatively a gas temperature measurement can be used for correction in some cases.

Once the volume of the reagent slug 130 has been determined, as described above, the reagent slug 130 may be released from the dosing channel 86 for further processing, for example to generate the radiopharmaceutical (block 160). In one embodiment, the compressed gas 148 may act as a piston or spring that pushes the reagent slug 130 out of the dosing channel 86. For example, once the target pressure in the range 150 has been reached and the volume of the reagent slug 130 has been determined, the controller 22 may provide instructions to the system 10 to direct the reagent slug 130 to another component (e.g., azeotropic dryer 48, reactor 60, etc.) of the cassette 12 for further processing. In certain embodiments, additional pressure may be applied at the outlet section 90 by opening the valve 106 to allow the gas 102 to flow into the dosing channel 130 and flush the reagent slug 130 out of the dosing channel 86 through the inlet section 88. This influx of the gas 102 from the outlet section 90 may facilitate total volume removal of the reagent slug 130 from the dosing channel 86, and therefore minimize dead volume (e.g., volume remaining within the dosing channel 86). As discussed above, the compressed gas 148 may act as a piston or spring to push the reagent slug 130 out of the dosing channel 86. To minimize undesirable effects of an under-dampened spring-mass system (e.g., compressed gas 148-reagent slug 130 system) such as flow rate variability, the compressed gas 148 may be configured to mimic a stiff spring. Accordingly, the dynamic response within the metering chamber 36 during metering of the reagent slug 130 may be controlled. That is, by having the compressed gas 148 mimic a stiff spring, rather than a flexible spring, oscillations in the flow of the reagent slug 130 from the dosing channel may be minimized, and the flow rate of the reagent slug 130 may be controlled.

Figure 9:
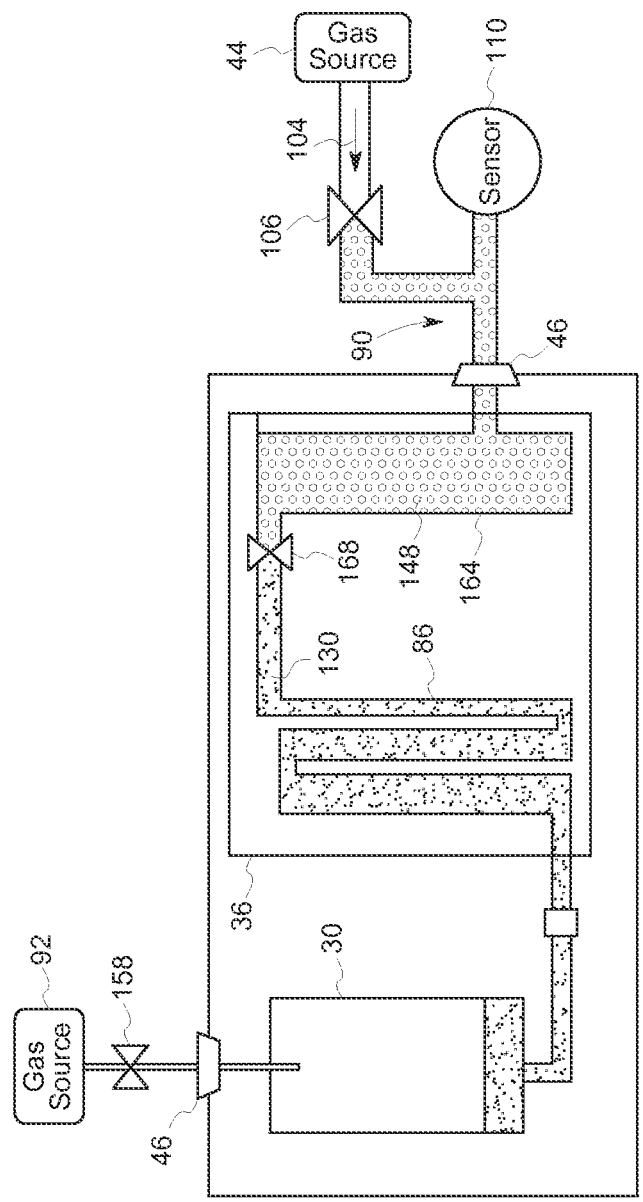
FIG. 9 is a schematic of a metering chamber having a gas reservoir, in accordance with an embodiment.

In other embodiments, the metering chamber 36 may include an integrated feature that facilitates the removal of the reagent slug 130 from the dosing channel 86 and may control the flow rate. FIG. 9 illustrates a portion of the metering chamber 36 having a gas reservoir 164. The gas reservoir 164 may be positioned at or near the outlet section 90. In certain embodiments, the gas reservoir 164 may include a pump (e.g., micropump) or any other suitable structure having a well defined geometry and known volume. The gas reservoir 164 may be fluidly coupled to the gas source 44 so that gas (e.g., gas 102) may be delivered to the gas reservoir 164. The gas source 44 may apply a known pressure to fill the gas reservoir with a desired compressed volume of the gas 148. However, in other embodiments, the gas reservoir 164 may be pre-filled with a known volume of the compressed gas 148 during manufacturing of the microfluidic cassette 12.

In addition to the valves 106 and 156, the metering chamber 36 may also include a valve 168. In embodiments where the gas reservoir is coupled to the gas source 46, the valve 168 may be closed to prevent the influx of gas into the dosing channel 86. Gas may continue to flow into the gas reservoir 164 until a desired volume of the compressed gas 148 is achieved, after which the valve 106 may be sealed to contain the compressed gas 148 within the gas reservoir 164, as described above. To release the reagent slug 130 from the dosing channel 86, the valves 168 and 156 may be opened and the compressed gas 148 may act as a compressed piston and force the reagent slug 130 out of the dosing channel 86 for further processing. Because the pressure and volume of the compressed gas 148 within the gas reservoir 164 is known, monitoring the pressure of the gas reservoir 164 (e.g., with sensor 110) may facilitate calculation of a displaced volume of reagent slug 130 from the dosing channel 96. The gas reservoir 164 may be repeatedly filled with the compressed gas 148 to meter the reagent slug 130 from the dosing channel 86 at a desired flow rate. For example, during release of the reagent slug 130, the flow rate of the reagent slug 130 may need to be adjusted. Accordingly, in one embodiment, the pressure within the gas reservoir 164 may be manipulated. This may be achieved by varying the compressed volume of the gas 148 within the gas reservoir 164. In embodiments where the gas reservoir 164 includes a pump, the flow rate of the reagent slug 130 may be adjusted by controlling the flow rate of the pump. However, any other suitable method of controlling the flow rate may also be used.

As discussed above, the cassette 12 may use compressed gas (e.g., compressed gas 148) to move fluids (e.g., reagent slug 130) throughout the cassette 12. Although the microfluidic devices (e.g., cassette 12) and the methods disclosed herein are directed to radiopharmaceutical synthesis processes, it should be noted that these devices and methods may also be used in other applications that may take advantage of the benefits of these devices, such as, but not limited to, contactless flow of fluids (e.g., flow without the use of mechanical actuators), dosing, sterility, low cost, or any combination thereof. For example, the microfluidic devices and methods disclosed herein may be used for processing and handling nocuous materials, air sensitive synthesis processes, and/or remote field diagnostic testing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method comprising:
    flowing a liquid into a channel of a microfluidic cassette filled with a gas, wherein the channel comprises an inlet section and an outlet section;
    detecting the liquid, the gas, or a combination thereof at a measuring location within the inlet section, wherein the measuring location has a first sensor configured to detect a signal indicative of a presence of the liquid, the gas, or a combination thereof;
    compressing the gas;
    determining a pressure change of the gas within the channel; and
    determining a volume of the liquid within the channel based on the pressure change of the gas.

2. The method of claim 1, comprising closing a valve on the outlet section in response to the detection of the liquid.

3. The method of claim 1, comprising filling a portion of the channel with the liquid to compress the gas.

4. The method of claim 1, wherein the outlet section comprises a second sensor configured to measure the pressure of the gas within the channel.

5. The method of claim 1, wherein compression of the gas creates a pressure differential across the liquid.

6. The method of claim 1, comprising delivering the volume of the liquid to a compartment within the microfluidic chip, wherein a pressure differential across the reagent moves the liquid into the compartment.

7. The method of claim 1, comprising filtering the gas, wherein the gas is filtered by one or more filters disposed between a gas source and the microfluidic cassette.

8. The method of claim 1, wherein the signal is representative of a refractive index of the liquid, the gas, or a combination thereof at the measuring location.

9. The method of claim 1, wherein the channel is configured to dissipate heat.

10. The method of claim 1, wherein the channel comprises a known volume.

11. A system comprising:
    a microfluidic chip comprising:
        a first compartment configured to store a reagent and is fluidly coupled to a second compartment via a first channel;
        a metering chamber disposed along the first channel, wherein the metering chamber comprises a second channel having an inlet section and an outlet section, and wherein the metering chamber is configured to meter a volume of the reagent to the second compartment based on a pressure change of a gas within the second channel; and
    a control system communicatively coupled to the microfluidic chip, wherein the control system is configured to provide instructions to one or more valves associated with the microfluidic chip, wherein the one or more valves are configured to control the influx and efflux of the reagent, the gas, or a combination thereof within the metering chamber.

12. The system of claim 11, wherein the metering chamber comprises a sensor disposed at a measuring site within the inlet section and configured to detect a fluid, wherein the fluid comprises the reagent, a gas, or a combination thereof.

13. The system of claim 11, wherein the outlet section comprises a sensor configured to detect a pressure of the gas within the second channel.

14. The system of claim 11, wherein the one or more valves are disposed at the outlet section and are configured to close upon detection of the reagent to contain the gas within the second channel.

15. The system of claim 11, wherein a flow of the reagent compresses the gas within the second channel to form a compressed gas.

16. The system of claim 11, wherein a compressed gas creates a pressure differential across the reagent, and wherein the pressure differential causes the reagent to flow into the second chamber.

17. The system of claim 11, wherein the second channel is configured to dissipate heat at a rate that is faster than a flow rate of the reagent into the second channel.

18. A microfluidic chip comprising:
- a first chamber configured to store a reagent and fluidly coupled to a second chamber via a first channel;
- a metering chamber disposed along the first channel, wherein the metering chamber comprises a second channel having an inlet section and an outlet section, and wherein the outlet section is configured to be coupled to a gas source;
- a first sensor disposed at a measuring site within the inlet section, wherein the first sensor is configured to detect a fluid within the measuring site; and
- a second sensor disposed at the outlet section, wherein the second sensor is configured to detect a pressure of the fluid.

19. The microfluidic chip of claim 18 comprising, a first valve disposed at the inlet section and a second valve disposed at the outlet section, wherein the first and second valves are configured to control an influx and efflux of the fluid from the second channel.

20. The microfluidic chip of claim 18, wherein the second channel has a defined geometry and a known volume.

* * * * *